Jan. 22, 1963    A. R. CUNNINGHAM    3,074,222
HAY RAKE
Filed Dec. 5, 1960    4 Sheets-Sheet 4
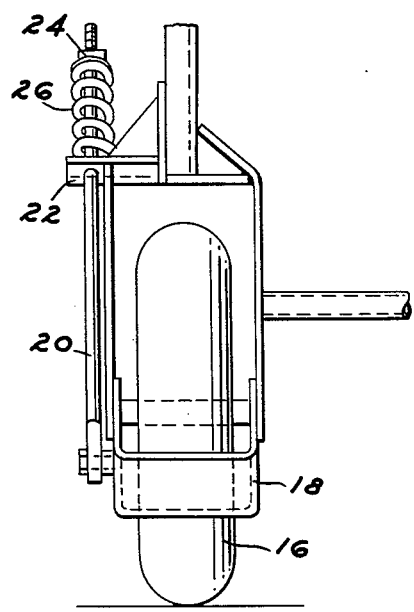
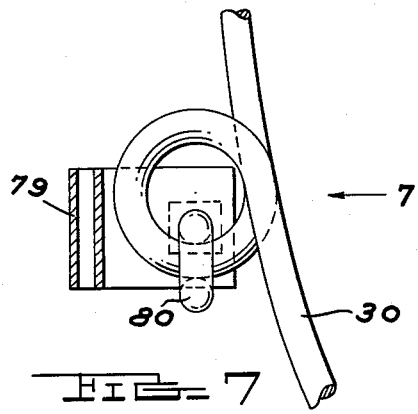
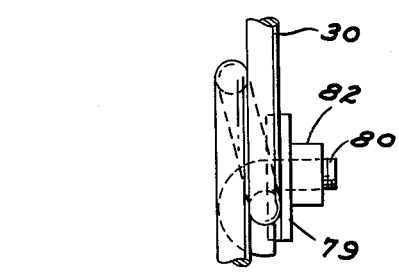
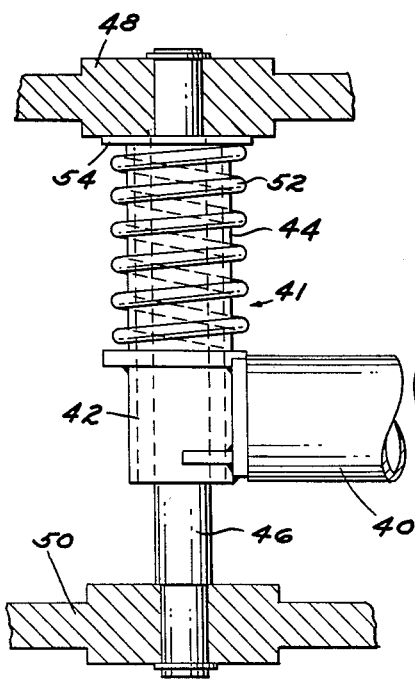
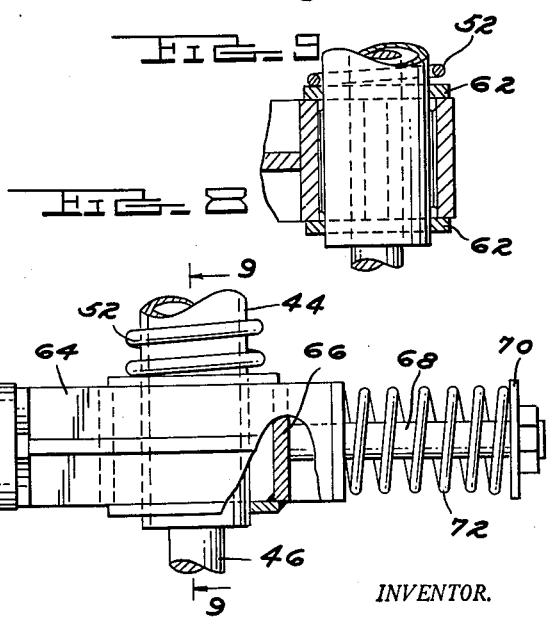
INVENTOR.
ARTHUR RAYMOND CUNNINGHAM
BY
Whittemore, Hulbert & Belknap
ATTORNEYS

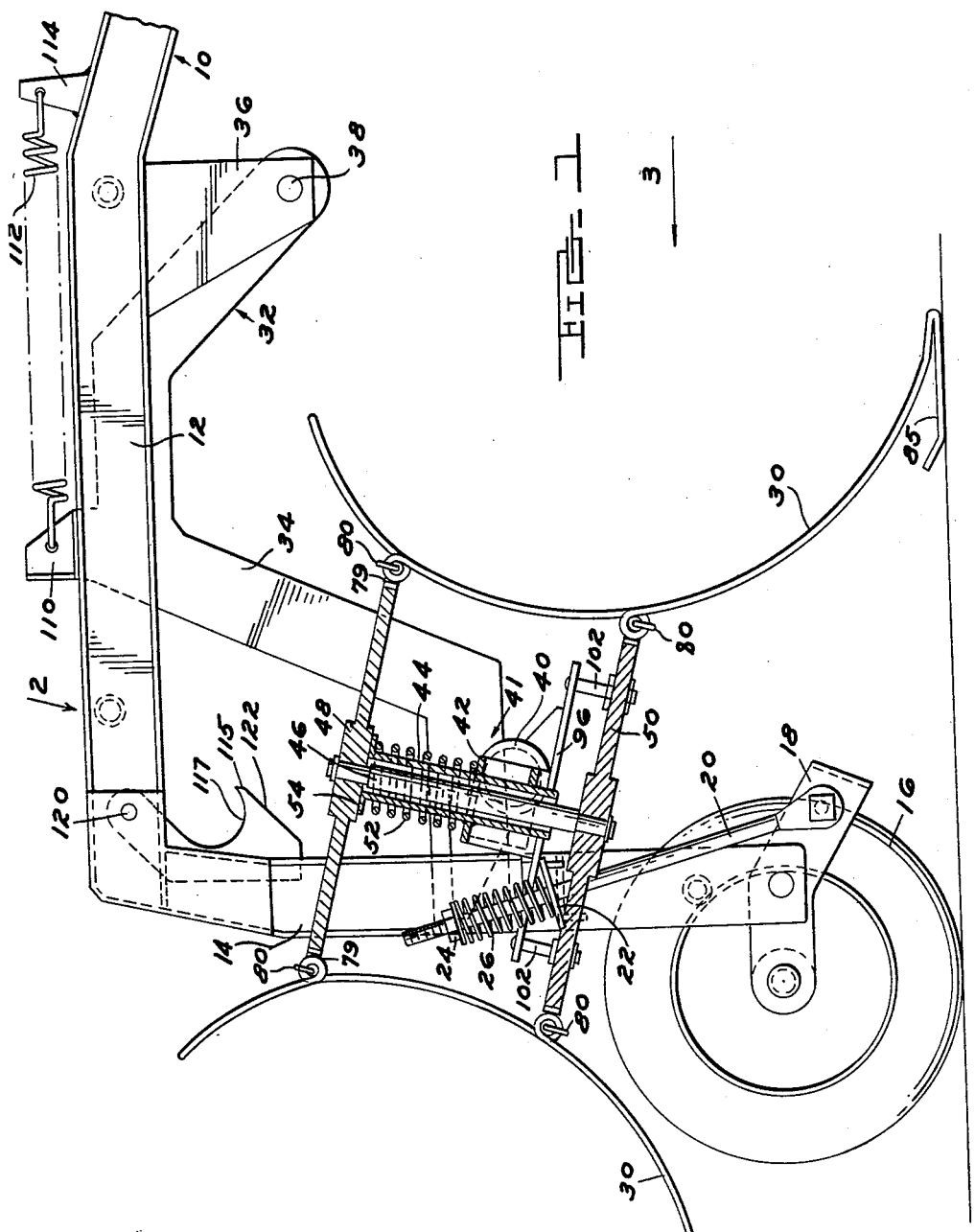

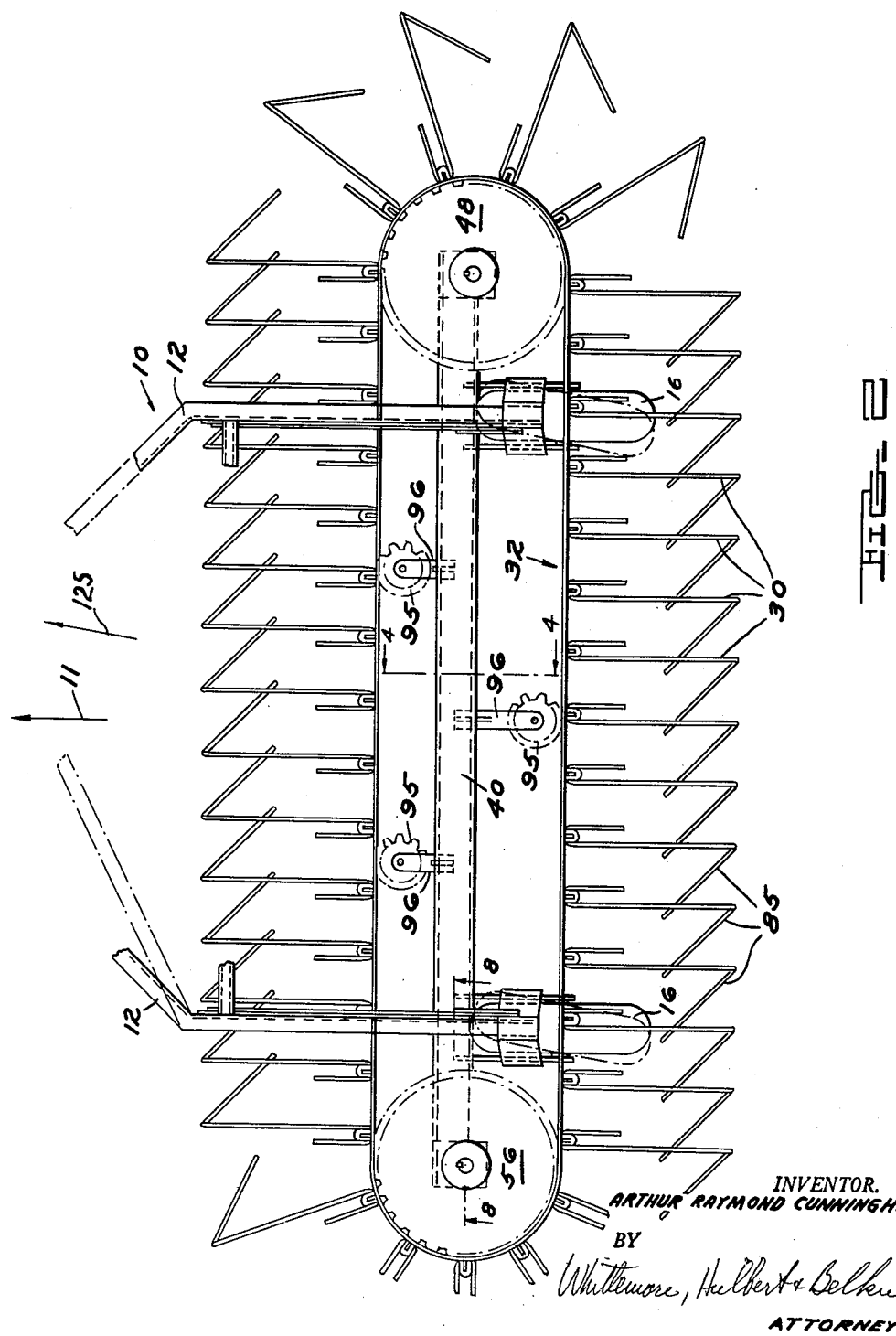

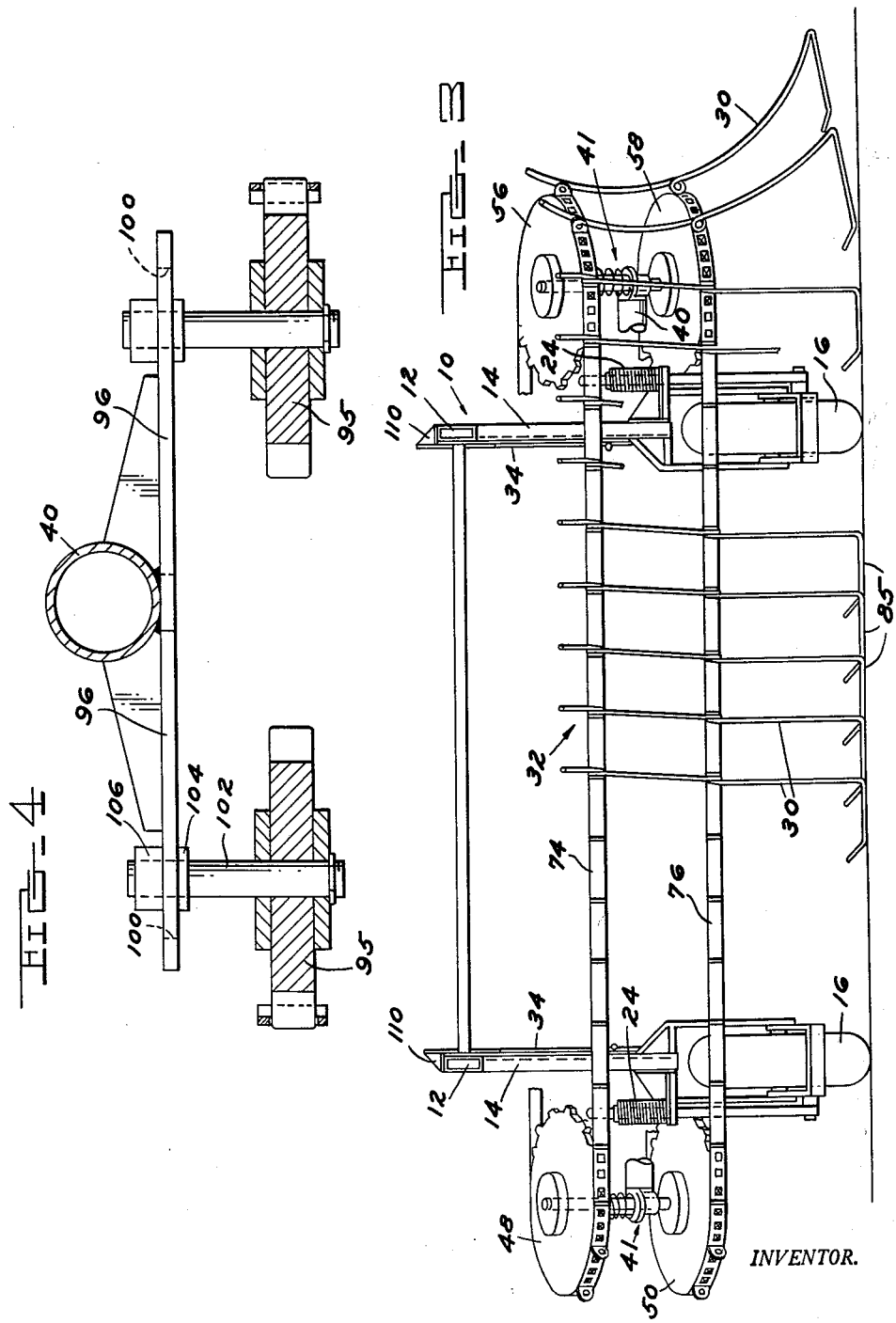

United States Patent Office 3,074,222
Patented Jan. 22, 1963

3,074,222
HAY RAKE
Arthur Raymond Cunningham, Chicago, Ill., assignor to Cunningham & Sons, Chicago, Ill., a partnership
Filed Dec. 5, 1960, Ser. No. 73,576
13 Claims. (Cl. 56—376)

This invention relates generally to hay rakes and refers more particularly to side delivery hay rakes.

One object of the invention is to provide a side delivery hay rake in which the rake tines move transversely, that is from one side to the other, to develop a windrow with a gentle sweeping action.

Another object of the invention is to provide a side delivery hay rake in which the tines for raking the hay are propelled with a continuous cross motion during forward advance of the machine. Specifically, the ground engaging portions of the tines are disposed at an acute angle relative to the direction of advance to effect the cross movement of the tines in response to the forward motion of the machine.

Another object of the invention is to provide a side delivery hay rake comprising a longitudinally movable frame, tine support structure including an endless flexible linear member extending in parallel reaches transversely of the longitudinal center line of the frame and mounted thereon for orbital movement in its own path, tines carried by the linear member in spaced relation and having ground engaging terminal portions which, while in one of the said parallel reaches, engage the ground and extend horizontally at an acute angle relative to the longitudinal center line to effect orbital movement of the linear member and tines in response to longitudinal movement of the frame.

Another object of the invention is to provide a side delivery hay rake in which the parallel reaches of the flexible linear member extend either at right angles or at an acute angle to the longitudinal center line of the frame.

Another object is to provide a side delivery hay rake in which the tines are removable for substitution of other similar tines, the angle of the ground engaging terminal portions of which is reversed for raking to the opposite side of the frame.

Other objects and advantages of the invention will become apparent as the following description proceeds, especially when considered in conjunction with the accompanying drawings. wherein:

FIG. 1 is a side elevational view partly in section of a side delivery hay rake embodying my invention.

FIG. 2 is a top plan view of the structure shown in FIG. 1, looking in the direction of the arrow 2. A modification is shown in dotted lines.

FIG. 3 is an elevational view of the hay rake looking in the direction of the arrow 3 in FIG. 1.

FIG. 4 is a sectional view taken on the line 4—4 of FIG. 2.

FIG. 5 is an enlarged fragmentary detail view of one of the wheel mountings.

FIG. 6 is an enlarged fragmentary detail view showing the connection between one of the chains and tines carried thereby.

FIG. 7 is a view looking in the direction of the arrow 7 in FIG. 6.

FIG. 8 is a view of certain portions of the tine support structure including two of the chain sprockets, with portions broken away, and illustrating a slightly modified construction.

FIG. 9 is a sectional view taken on the line 9—9 of FIG. 8.

Referring now more particularly to the drawings, and especially to FIGS. 1–3 thereof, the side delivery hay rake there shown comprises a longitudinally movable draft frame generally indicated at 10. The draft frame moves in a forward direction which parallels its longitudinal center line, the direction of forward movement being indicated by the arrow 11 in FIG. 2. The draft frame comprises the side bars 12 which extend rearwardly and have downwardly offset portions 14 to the lower ends of which are mounted the ground engaging wheels 16.

As shown particularly in FIG. 1, a wheel mounting lever 18 is pivoted intermediate its length to the lower end of each downward extension 14 of the side bars 12. Actually the wheel mounting levers 18 are in the form of yokes, the legs of which straddle the respective wheels. The wheel axles are journaled to the rear ends of the opposed legs, and pivoted to the forward ends thereof are the suspension bars 20. Each suspension bar projects upwardly through a hole in a bracket 22 carried by the associated downward side bar extension 14, and has an abutment 24 at the upper end with a coil spring 26 encircling the rod between the abutment and bracket 22. The coil spring is under compression and provides a yielding support for the frame on the ground-engaging wheels.

The forward end of the draft frame 10, not shown, will have provision for attachment to a towing vehicle such as a tractor or other vehicle by means of which it may be towed across a field.

The rake structure includes a plurality of like tines 30 of the configuration illustrated in the drawings, and tine supporting structure generally indicated at 32. The tine supporting structure comprises a pair of parallel arms 34, the forward ends of which are pivoted to downward extensions 36 of the draft frame side bars 12. The pivots for the arms 34 are aligned, horizontal and at right angles to the longitudinal center line of the frame, being indicated at 38. At their rear ends, the arms have secured thereto a horizontal transverse tube or pipe 40 the axis of which is disposed at right angles to the longitudinal center line of the frame.

A pair of sprockets are carried by the pipe at each end thereof. Referring particularly to FIGS. 1 and 2, it will be seen that the pipe supports a bracket 42 which in turn carries a tube 44. A sprocket spindle 46 extends through the tube 44 and has a sprocket secured to either end thereof. The sprockets are designated 48 and 50. A compression coil spring 52 surrounds the tube 44 and at one end abuts the bracket 42 and at the other end presses against a washer 54 on the under side of the sprocket 48. The spring 52 is under compression and tends to hold the sprocket and spindle assembly in an upward position. The mounting for the sprocket and spindle assembly is generally indicated at 41, and a like mounting assembly 41 is provided for the other pair of sprockets 56 and 58 at the opposite end of the pipe.

An alternative construction is shown in FIGS. 8 and 9 in which one of the sprocket and spindle assemblies is supported as described above by a mounting 41, and the other is supported in a somewhat different manner. As there shown, the tube 44 which surrounds the spindle 46 for the sprockets has collars 62 secured thereto in longitudinally spaced relation both above and below the bracket extension 64 of pipe 40. Hence the tube 44 and the spindle and sprocket assemblies supported thereby can move longitudinally with respect to the pipe. The collars 62 have a connecting plate 66 from which projects a rod 68 having an abutment 70 at the outer end. A coil spring 72 compressed between the abutment and between the adjacent end of the bracket extension 64 normally urges the tube 44 to the right to place the chains which extend over the sprockets under tension, as will appear more fully from the following description.

The sprockets are all of the same diameter, and the pair of sprockets at either end are axially aligned and spaced apart the same distance. An endless chain is trained around the upper sprockets and a second endless chain is trained around the lower sprockets. The upper chain is designated 74 and the lower chain 76. The chains are apertured at spaced intervals corresponding to the spacing of the teeth on the sprockets to be drivingly engaged thereby. The tines are mounted on the chains in equally spaced relation thereabout, and together the chains provide a flexible linear member which moves in closed path.

Each tine is secured to both chains by a novel connection which is best shown in FIGS. 6 and 7. As there shown, tine brackets 79 project outwardly from the chain. The brackets are secured to the chain in any suitable manner and are apertured at their outer ends. A curved mounting bolt 80 projects through each aperture and is secured to the plate by a nut 82. The curved end of the bolt extends about a looped portion of the tine, and when the nut 82 is tightened it draws the bolt and hence the tine up tight against the mounting bracket. All of the mountings for the tines are the same on both chains.

As shown particularly in FIG. 1, the orbit of the flexible linear member defined by the chains extends at a slight angle, and specifically, is tilted downwardly and in a forward direction. The orbit of the linear member has a pair of parallel reaches which extend at right angles to the longitudinal center line of the rake frame so that the movement of the tines in the respective reaches is likewise at right angles to the longitudinal center line. The tines are curved throughout substantially their entire length, and at the lower end of each tine has a ground-engaging terminal portion or foot 85 which, in the lower reach thereof, extends parallel to and engages the ground. Hence, this ground-engaging terminal portion in the lower reach of the flexible linear member is horizontal, and as viewed particularly in FIG. 3 it will be seen that this terminal portion extends at an acute angle with respect to the longitudinal center line of the frame and at its free end is turned upwardly.

By reason of the acute angle formed by the terminal portions of the tines, and by reason of their ground engagement in the lower reach of the flexible linear member, the flexible linear member and tines are propelled and caused to move in their orbit in response to a forward movement of the draft frame. In FIG. 3, the tines shown move to the right, and in FIG. 2 the tines orbit counter-clockwise. Hence, as the hay rake is moved in a forward direction across the ground, the tines will continuously move within their orbit by reason of the ground engagement of the terminal portions thereof in the lower reach. The curved portion of the tines adjacent to the ground-engaging portions thereof, as well as the ground-engaging portions including the upturned ends thereof, causes hay and other cuttings on the ground to be moved to the side with the rake tines. The hay is thus moved with a gentle sweeping action and forms a windrow to one side of the machine.

Preferably, idler sprockets 95 are provided to guide the lower chain, as seen in FIGS. 1, 2 and 4. Each idler sprocket is supported on an arm 96 which is rigidly secured to the pipe 40 and projects laterally outwardly therefrom. As seen in FIG. 4, each arm has a longitudinal slot 100 at its outer end and the sprocket spindle 102 projects therethrough and may be locked in the desired position of longitudinal adjustment within the slot. Each spindle has an abutment 104 on one side of the arm and a nut 106 threaded on the opposite side thereof may be tightened to lock the spindle in position. The spindle projects from its associated arm at right angles thereto and supports the idler sprocket in position to engage the lower chain.

A spring suspension is provided for the arms 34 which support the tine structure. As shown particularly in FIGS. 1 and 3, the arms 34 each have angle brackets 110 which extend laterally over the horizontally extending portions of the draft frame arms 12. These brackets 110 provide a limit of downward swinging movement of the arms 34 by reason of their engagement with the arms 12. Hence, the tine structure cannot descend beneath the position illustrated in FIG. 1. However, should an obstruction be encountered, the tine structure can lift slightly to clear the obstruction, being movable about the aligned pivots 38 for this purpose. In order to somewhat counterbalance the weight of the tine structure, coil springs 112 connected at one end to the brackets 110 and at the other end to the brackets 114 on the draft frame arms 12, tend to support the tine structure and in effect lighten it. Hence, a spring suspension for the tine structure is provided. Springs 52 also provide a yielding suspension for the sprockets and chains.

When not in use, the tine structure is raised about the axis of the pivots 38 to a position in which the pipe 40 can be engaged by the swinging latches 115 (FIG. 1). Latches 115 each have a curved supporting recess 117 corresponding in diameter to that of the pipe. The latches are pivoted at their upper ends by pins 120, and thus can swing clear of the pipe during its upward movement. The latches have cam surfaces 122 on the lower side to be cammed out of the way by the pipe during its upward movement. The latches are weighted to drop into latching position.

The mounting bolts 80 and nuts 82 provide removable mounts for the individual tines. Hence the tines may be replaced when damaged, and in fact an entirely new set of tines may be substituted having ground engaging terminal positions angling in the opposite direction for raking action to the opposite side of the frame. The acute angle formed by the terminal portions of the substituted tines would cause the tines to orbit in the opposite direction in response to a forward movement of the draft frame.

A slightly modified construction is shown in dotted lines in FIGURE 2. The wheels 16 shown in dotted lines are parallel but angled somewhat, and the side bars of the draft frame are offset somewhat at their forward ends for attachment to a towing vehicle or tractor. The direction of forward movement of the modified rake will parallel its longitudinal center line indicated at 125. The longitudinal center line, or direction of forward movement, is parallel to the wheels 16.

In the modified construction, the parallel reaches of the flexible linear member defined by the tine supporting chains extend at an acute angle to the longitudinal center line of the frame. This is in contrast to the construction shown in solid lines in FIG. 2 in which the parallel reaches extend at right angles to the longitudinal center line. By thus angling the rake slightly with respect to the longitudinal center line of the frame the rake orbits somewhat more easily.

What I claim as my invention is:

1. A side delivery rake comprising a longitudinally movable frame, rake structure including a plurality of tines mounted on said frame for movement transversely of the longitudinal center line thereof, said tines being spaced apart transversely of said longitudinal center line and having elongated portions which extend generally horizontally at an acute angle relative to said longitudinal center line and have an extended ground contact, thereby to effect a transverse movement of said tines in response to longitudinal movement of said frame, the transverse movement of said tines operating to rake a cut crop on the ground to one side of said frame.

2. The side delivery rake defined in claim 1, in which said rake structure includes a resilient support for said tines suspending the same from said frame and permitting said tines to engage the ground in light pressure contact.

3. The side delivery rake defined in claim 1, in which said tines are mounted on said frame for movement at right angles to the longitudinal center line thereof.

4. The side delivery rake defined in claim 1, in which said tines are mounted on said frame for movement along a path extending at an acute angle to the longitudinal center line thereof, the inclination of said path with respect to said longitudinal center line being opposite that of said elongated portions of said tines.

5. A side delivery rake comprising a longitudinally movable frame, a plurality of tines, tine support structure mounted on said frame and supporting said tines in a spaced sequence defining a closed loop for orbital movement in the endless path of said loop, a portion of said endless path extending transversely of the longitudinal center line of said frame and said tines having elongated portions which, while said tines are in the transverse portion of said path, extend generally horizontally at an acute angle relative to said longitudinal center line and have an extended ground contact, thereby to effect an orbital movement of said tines in response to longitudinal movement of said frame, the movement of said tines through the transverse portion of said path operating to rake a cut crop on the ground to one side of the frame.

6. A side delivery rake comprising a longitudinally movable frame, a plurality of tines, tine support structure including an endless flexible linear member extending in parallel reaches transversely of the longitudinal center line of said frame and mounted on said frame for orbital movement in its own path, said tines being carried by said linear member in spaced relation and having elongated portions which, while said tines are in one of said parallel reaches, extend generally horizontally at an acute angle relative to said longitudinal center line and have an extended ground contact, thereby to effect orbital movement of said tines in response to longitudinal movement of said frame, the movement of said tines through the said one of said parallel reaches operating to rake a cut crop on the ground to one side of the frame.

7. The side delivery rake defined in claim 6, in which said tine support structure is spring suspended from said frame permitting said tines to engage the ground in light pressure contact.

8. The side delivery rake defined in claim 6, in which said linear member includes a pair of axially spaced chains to which each tine is secured.

9. The side delivery rake defined in claim 6, in which said one of said parallel reaches extends at right angles to the longitudinal center line of said frame.

10. The side delivery rake defined in claim 9, in which said tines are removably carried by said linear member for substitution of other similar tines the angle of the elongated portions of which is reversed for raking to the opposite side of said frame.

11. The side delivery rake defined in claim 6, in which said one of said parallel reaches extends at an acute angle to the longitudinal center line of said frame at an inclination with respect thereto opposite the inclination of said elongated portions.

12. The side delivery rake defined in claim 6, in which said tines have raking shank portions and said elongated portions are terminal parts of said tines which are substantially straight and extend from said shanks in a rearward direction.

13. The side delivery rake defined in claim 12, in which said elongated portions of said tines have upturned free ends.

References Cited in the file of this patent

UNITED STATES PATENTS

| | | |
|---|---|---|
| 2,511,100 | Clark | June 13, 1950 |
| 2,694,895 | Gronlund et al. | Nov. 23, 1954 |
| 2,711,065 | Orelind | June 21, 1955 |